United States Patent [19]

Hennig

[11] Patent Number: 4,745,848
[45] Date of Patent: May 24, 1988

[54] BELLOWS

[75] Inventor: Kurt Hennig, Munich, Fed. Rep. of Germany

[73] Assignee: Gebr. Hennig GmbH, Ismaning, Fed. Rep. of Germany

[21] Appl. No.: 751,317

[22] Filed: Jul. 2, 1985

[30] Foreign Application Priority Data

Jul. 11, 1984 [DE] Fed. Rep. of Germany ....... 3425548

[51] Int. Cl.⁴ ............................................. F01B 19/00
[52] U.S. Cl. ............................................. 92/34; 92/47
[58] Field of Search .................... 92/42, 45, 47, 34; 138/121; 354/187

[56] References Cited

U.S. PATENT DOCUMENTS

| | | | |
|---|---|---|---|
| 1,717,196 | 6/1929 | Emmet | 92/45 |
| 2,583,308 | 1/1952 | Sloan | 92/42 |
| 2,752,172 | 6/1956 | Ziebold | 92/34 |
| 2,913,010 | 11/1959 | Whitney, Jr. | 92/34 |
| 3,090,403 | 5/1963 | Kroekel | 92/45 |
| 3,213,764 | 10/1965 | Nelson | 92/47 |
| 3,315,704 | 4/1967 | Shire | 92/47 |
| 3,319,532 | 5/1967 | Pridham, Jr. | 92/47 |
| 3,482,302 | 12/1969 | Williams | 92/45 |
| 3,721,371 | 3/1973 | Dolveck | 92/34 |
| 4,336,747 | 6/1982 | Totty | 92/47 |
| 4,579,045 | 4/1986 | Tominaga | 92/45 |

FOREIGN PATENT DOCUMENTS

| | | | |
|---|---|---|---|
| 904266 | 8/1962 | United Kingdom | 92/47 |
| 2113123 | 8/1983 | United Kingdom . | |

Primary Examiner—Abraham Hershkovitz
Attorney, Agent, or Firm—Thomas & Kennedy

[57] ABSTRACT

The invention relates to a bellows in which the cover projects like a roof over the two arms and the apexes of the inner layer of the arms are supported on the inner layer of the cover. In this way a very robust and wear-resistant construction of the bellows is obtained.

11 Claims, 4 Drawing Sheets ot

BELLOWS

BACKGROUND OF THE INVENTION

This invention relates to a bellows of the type set out in U.K. patent application No. 2,113,123. Whilst the cover and the arms of this known bellows have a common continuous outer layer made from fabric, the inner layer which is provided for stiffening purposes consists of three individual parts formed by perforated sheets which are perforated along the edges of the pleats.

FIG. 1 represents the prior art and shows the conventional construction of the inner layer in a schematic view. The inner layer of a bellows of the whole bellows consists of an inner layer 1 for the cover of the bellows and two inner layers 2 for the two arms of the bellows. The inner layers 1 and 2 of the cover and the arms are cut in a triangular shape on the sides facing one another, so that the apexes 1a and 2a lie against one another but are not continuous. The inner layers 1 and 2 of the cover and the arms of the bellows are provided with perforations 3 in the region of the later edges of the pleats.

The inner layers 1 and 2 of the cover and the two arms of the bellows are adhered to a continuous outer layer made from fabric, and this ensures that the three inner stiffening layers hold together. Then the two arms of the bellows are folded in and, if required, crosspieces can also be fixed between individual pleats for further stiffening.

The main disadvantage of this known bellows according to FIG. 1 is that the apexes 1a, 2a of the inner layer of the cover and the arms pierce the outer fabric layer and damage this outer layer even after the bellows has been operating only for a comparatively short time.

The object of the invention, therefore, is to provide a bellows which is distinguished by a very stable and lasting construction.

In the bellows according to the invention the cover projects like a roof over the two arms and the apexes of the inner layer of the arms are supported on the inner layer of the cover, and therefore the grave danger of damage to the outer layer caused by the apexes of the inner layer of the arms, as occurs with the known bellows (FIG. 1), is avoided. Because of the particularly lasting and wear-resistant construction of these very critical parts of the bellows the construction according to the invention is distiguished by a long operating life.

The construction of the bellows according to the invention is advantageous above all for applications in which lasting sealing of the bellows is required.

Advantageous embodiments of the invention are the subject matter of the subordinate claims and are explained in connection with the description of two embodiments which are illustrated in the drawings.

DETAILED DESCRIPTION

Figure 2:
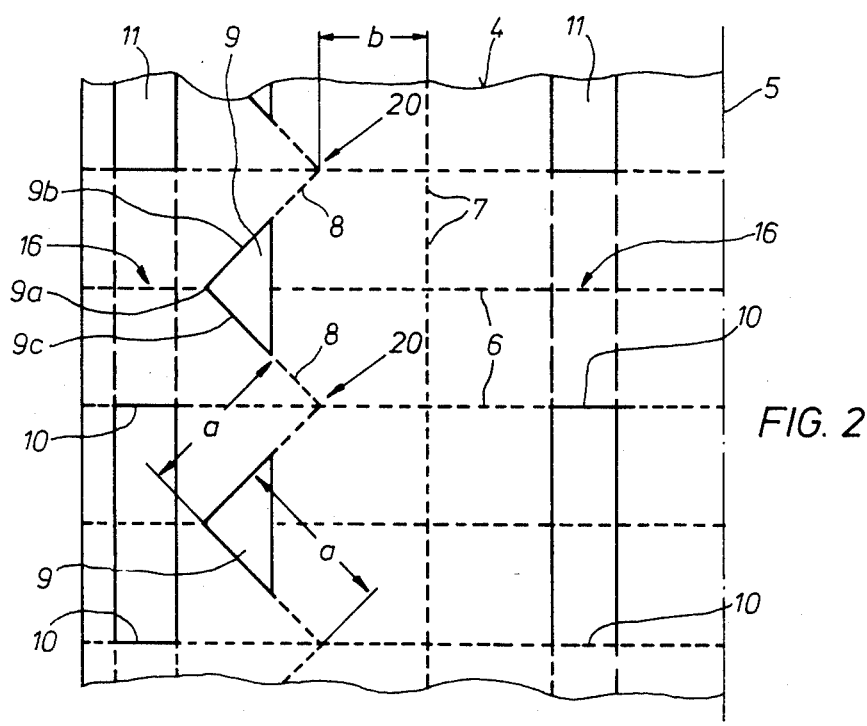
FIG. 2 shows a partial representation of the inner layer which is made in one piece of a first embodiment of the bellows according to the invention (with flap strips drawn in)

FIG. 2 shows the inner layer of a first embodiment of the bellows according to the invention. A common continuous inner layer 4 is used for the cover and the two lateral arms of the bellows. Only part of one half of the inner layer 4 is shown in FIG. 2; the longitudinal axis of the inner layer 4 is designated by 5.

The inner layer 4 is made from a plastics sheet which has perforations 6 running at right angles to the longitudinal direction of the bellows in the region of the later pleat edges. Perforations 7 are also provided which run in the longitudinal direction of the bellows and mark the side edges of the cover. Finally, a perforation 8 running in a zig-zag pattern is provided between the lateral arms and the cover of the bellows.

In the region between the later inner pleats of the arms and the cover the inner layer 4 is provided with triangular stampings 9 which do not meet each other. These stampings 9 have the shape of an isosceles triangle in which the apex 9a of the triangle coincides with the (later) upper end of the inner pleats of the arms and the length of the sides 9b, 9c of the triangle is smaller than the distance "a" between the upper ends of the (later) inner and outer pleats of the arms of the bellows.

At individual points 10 the perforations 6 on the pleat edges are widened like slots so that flap strips 11 can be drawn into the inner layer 4 in the manner shown in FIG. 2. Thus these strips each run above the inner layer 4 in the region of one double pleat and below the inner layer 4 in the region of the next double pleat. The flap strips 11 are advantageously made from fabric and are coated on the outer surface with a sheet which is perforated along the pleat edges.

In order to produce the bellows, first of all the inner layer 4 is provided with all the said perforations and stampings. Then the flap strips 11 are drawn into the inner layer 4, preferably so that in each case there is one flap strip in the region of each arm and two flap strips in the region of the cover.

Figure 3:
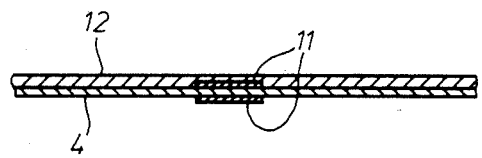
FIG. 3 shows a schematic section through the multi-layer wall of the bellows according to FIG. 2.

Then the inner layer 4 with the flap strips 11 drawn into it is placed on an outer layer 12 which is preferably made of fabric and the two layers are connected firmly together, preferably by adhesion. The flap strips 11 are only adhered to the outer layer 12 in the parts located between the inner layer 4 and the outer layer 12. Figure 3 shows the multi-layer wall construction thus obtained: The flap strips 11 run between the inner layer 4 and the outer layer 12 but in each case in the region of adjacent pleats pass through the aforementioned slots at the points 10 of the pleat perforations 6 to the inner face of the inner layer 4.

After the inner and outer layers 4, 12 have been connected, the two arms of the bellows are folded in along the perforations 7 and 8. This results in the construction which can be seen in FIGS. 4, 5 and 6 in which the cover 13 of the bellows projects laterally, i.e. like a roof, over the two arms 14 by the dimension b (cf. FIGS. 2 and 4).

Before the two arms are folded in, the flap strips 11 on the inner face of the inner layer 4 are preferably divided up at the points provided for the fixing of crosspieces 15 (e.g. at the point 1b, cf. FIG. 2) so that individual flaps 17 (cf. FIG. 4) are produced to which the crosspieces 15 can be fixed (for example by adhesion or by riveting).

Figure 5:
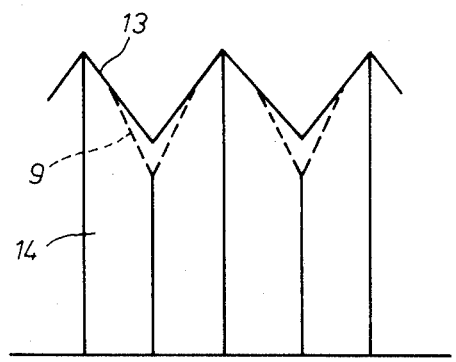
FIGS. 5 and 6 show side views of the bellows according to the invention in different extended positions.
Figure 6:
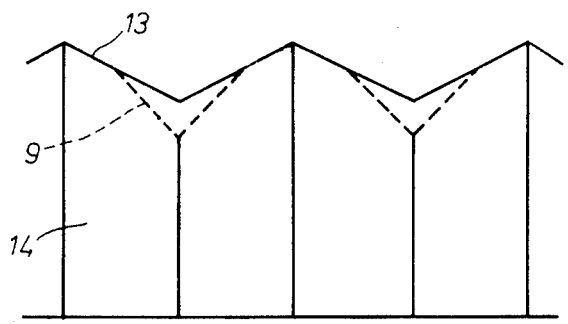

FIGS. 5 and 6 show schematically the function of the triangular stampings 9 in the extending movement of the bellows.

In the region of the triangular stampings 9 of the inner layer 4 the wall thickness of the arms of the bellows only consists of the outer layer 12, i.e. fabric, and therefore the bellows does not put up any great resistance against the initial extending movement (transition from the state shown in FIG. 5 to the state shown in Figure 6). However, in the further extending movement (for instance, beyond the state shown in FIG. 6) the surface regions of the inner layer 4 adjoining the triangular stampings 9 increasingly resist any further deformation so that a desired progressive extension stop is produced. By selection of the size of the stampings 9 it is possible to influence as required the time at which an extension stop comes into effect during the extending movement. It will be recognised from a study of FIGS. 2, 5 and 6 that the extension stop comes into effect all the more early the smaller the triangular stampings are chosen to be The cover 13 of the bellows according to the invention can be provided on its upper surface (and possibly also on its lower surface in the region which projects like a roof) with reinforcement made from metal wires and plastic fibres. The metal wires advantageously run parallel to the pleat edges and the plastic fibres at right angles to the pleat edges.

The perforations of the inner layer 4 can be filled with plastic coating material after the bellows has been produced and the pleats have thus been converted from the plane position to the pleated position. If the plastic coating material is introduced and hardened with the bellows in a more or less compressed state, when the bellows is later extended a desired additional resistance to the extending movement will be put up by the plastic coating material present in the perforations.

The plastic coating material introduced into the perforations of the inner layer also provides a stiffening of the pleats which makes it possible if required to allow the pleats to rest directly on the bench. In this case the arms of the bellows can be fixed for example by angles.

Within the scope of the invention it is of course also possible for the perforations of the inner layer to be formed by a pre-marked broken line which is weakened by cut-outs.

Figure 1:
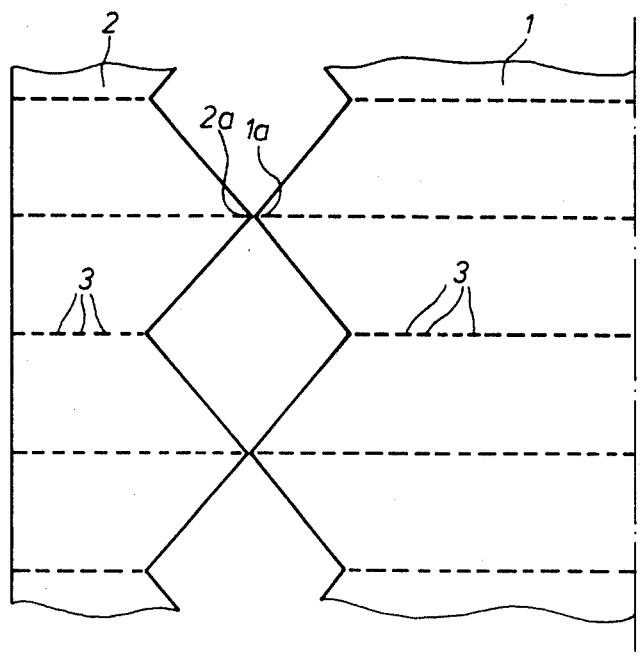
FIG. 1 shows a partial representation of the multi-part inner layer of a known bellows.
Figure 4:
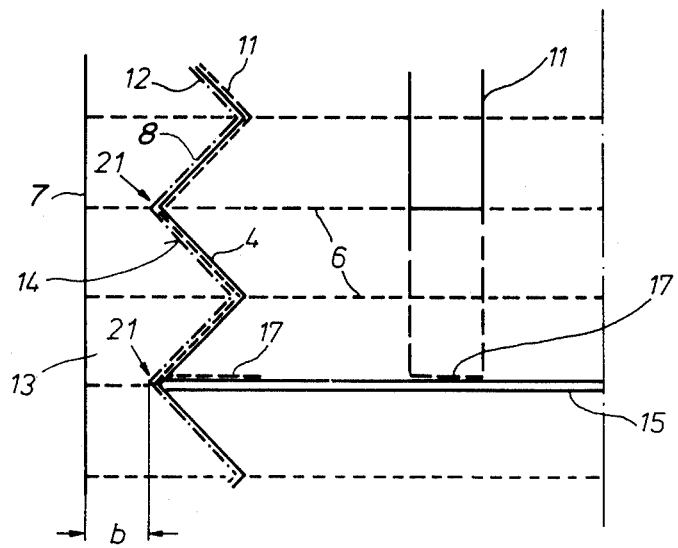
FIG. 4 shows a partial view of the bellows according to FIG. 1 from below (into the bellows)

As can be learned from the above description and can be seen in particular from FIG. 2, the edge of the inner layer 4 of the arms facing the cover is in the form of triangles the apexes 20 of which each form the upper end of an outer pleat 21 (FIG. 4) of the arms 14. As the view of the bellows from below in FIG. 4 shows, the cover 13 projects like a roof over the two arms 14. The apexes 20 of the inner layer 4 of the arms 14 are accordingly supported on the inner layer 4 of the cover 13. In this way the apexes of the inner layer of the arms and the cover are prevented from lying directly opposite one another in the manner shown in FIG. 1 and thus causing a high degree of strain and rapid wear on the outer layer 12.

Figure 7:
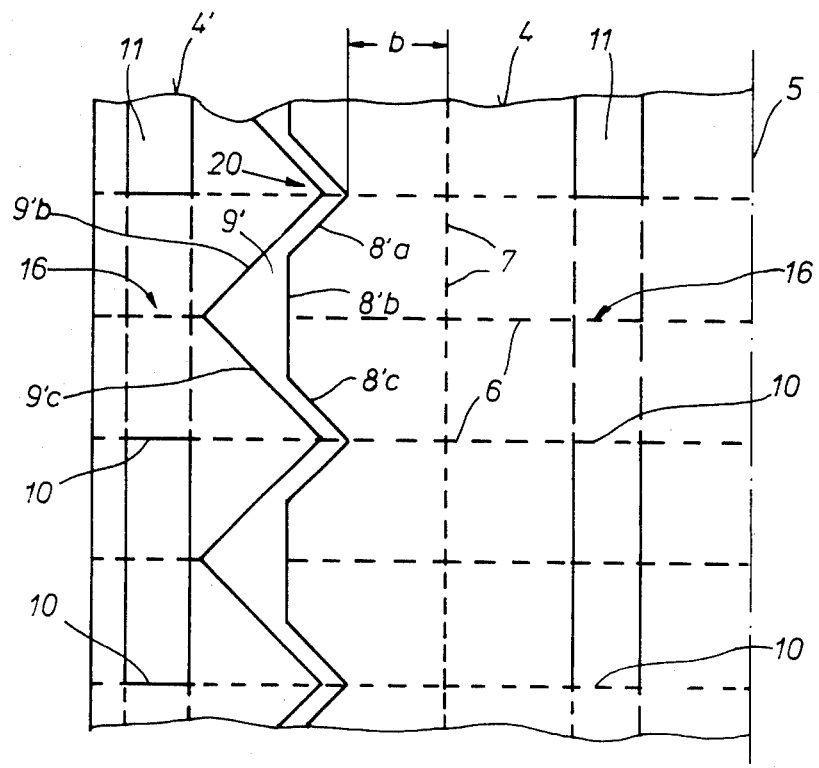
FIG. 7 shows a partial representation of the inner layers of a second embodiment of the bellows according to the invention.
Figure 8:
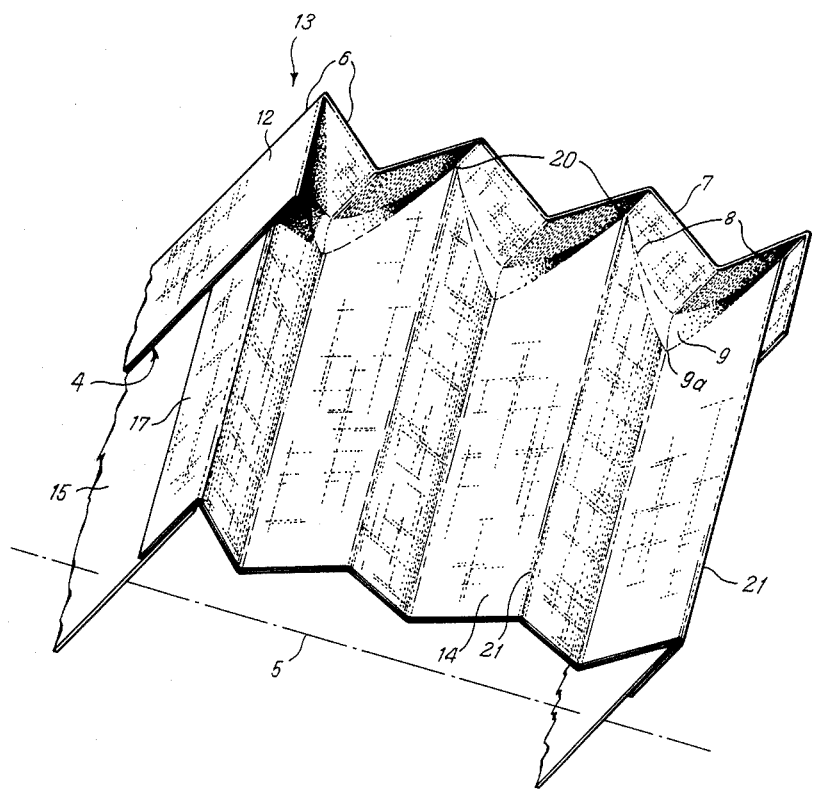
FIG. 8 shows a perspective view of a corner portion of the first embodiment of the bellows, illustrating how the cover overhangs an arm.

FIG. 7 shows a second embodiment of the invention in which the same reference numerals are used as in FIG. 2 for the same elements.

In the construction according to FIG. 7 the cover 13 and the arms 14 each have a separate inner layer 4 and 4' respectively which are separated from each other by arrow-shaped spaces 9'. Thus the spaces 9' are defined on the side of the arms 14 by two straight edges 9'b and 9'c and on the side of the cover 13 by the edges 8'a, 8'b and 8'c.

In this embodiment too the cover 13 projects over the two arms like a roof. The apexes 20 of the inner layer 4' of the arms 14 are supported on the inner layer 4 of the cover 13.

I claim:

1. A bellows comprising a pleated cover (13) and two pleated arms (14) connected laterally to the cover, in which the cover and the arms are of multi-layer construction and include at least one continuous outer layer (12) and one inner layer (4) which is connected to the outer layer and is formed by a sheet which is perforated along the pleat edges, said continuous outer layer (12) of said cover (13) and arms (14) being made from fabric, and triangular stampings (9) are provided in the inner layer (4) and have the shapes of isosceles triangles in which the apex (9a) of each triangle coincides with the upper end of the inner edges of the pleats of the arms, and the lengths of the sides (9b, 9c) of the triangles are smaller than the distance (a) between the upper ends of the inner and outer edges of the pleats of the arms whereby the pleated cover (13) projects like a roof over the two pleated arms (14) and the apexes (20) of the inner layer (4) of the arms (14) are supported on the inner layer (4) of the cover (13).

2. The bellows as claimed in claim 1, characterised in that the cover (13) and the arms (14) also have a common continuous inner layer (4) which is provided in the region between the pleats of the arms and of the cover with individual stampings (9) which do not meet each other.

3. The bellows as claimed in claim 1, characterised in that the cover (13) and the arms (14) each have a separate inner layer (4, 4') which are separated from each other by arrow-shaped spaces (9').

4. The bellows as claimed in claim 1, characterised in that the cover has at least on its upper surface a reinforcement made from metal wires and plastic fibres, in which the metal wires run parallel to the pleat edges and the plastic fibres at right angles to the pleat edges.

5. A bellows comprising a pleated cover (13) and two pleated arms (14) connected laterally to the cover, in which the cover and the arms are of multi-layer construction and include at least one continuous outer layer (12) and one inner layer (4) which is connected to the outer layer and is formed by a sheet which is perforated along the pleat edges, the inner layer (4) also having perforations (7) along the side edges of the cover running in the longitudinal direction of the bellows and a zig-zag shaped perforation (8) running between the arms (14) and the cover (13), said continuous outer layer (12) of said cover (13) and arms (14) being made from fabric and the edge of the inner layer of the arms facing the cover having the shape of triangles the apexes (20) of which each form the upper end of an outer pleat (21) of the arms, characterized in that the pleated cover (13) projects like a roof over the two pleated arms (14) and the apexes (20) of the inner layer (4) of the arms (14) are supported on the inner layer (4) of the cover (13).

6. A bellows comprising a pleated cover (13) and two pleated arms (14) connected laterally to the cover, in which the cover and the arms are of multi-layer construction and include at least one continuous outer layer (12) and one inner layer (4) which is connected to the outer layer and is formed by a sheet which is perforated along the pleat edges, said continuous outer layer (12) of said cover (13) and arms (14) being made from fabric and the edge of the inner layer of the arms facing the cover having the shape of triangles the apexes (20) of which each form the upper end of an outer pleat (21) of the arms, characterized in that the inner layer (4) has flaps (17) for fixing crosspieces (15) arranged between individual pleats, and the pleated cover (13) projects like a roof over the two pleated arms (14) and the apexes (20) of the inner layer (4) of the arms (14) are supported on the inner layer (4) of the cover (13).

7. The bellows as claimed in claim 6, characterised in that the flaps (17) are parts of the flap strips (11) which are drawn in the longitudinal direction of the bellows into openings in the pleat performation (6) of the inner layer (4).

8. The bellows as claimed in claim 7, characterised in that the flap strips (11) which are made from fabric are coated on the outer surface with a sheet which is perforated along the pleat edge.

9. The bellows as claimed in claim 7, characterised in that the flap strips (11) are each to the outer layer (12) in the regions in which they lie on the outer surface of the inner layer (4), together with the other surface regions of the inner layer (4).

10. A bellows including spaced end walls movable toward and away from each other and accordion pleated sheet material attached to the edge portions of the end walls with the pleats of the sheet material extending parallel to the end walls, said accordion pleated sheet material being formed with a right angle fold structure extending across the lengths of the accordion pleats of the sheet material and forming the sheet material into a cover (13) and a laterally extending arm (14), the improvement therein of said right angle fold structure being formed by a first return fold (7) that forms the sheet material in a span (b) of sheet material in underlying relationship with respect to said cover and a second fold (8) that forms the arm (14) of the sheet material at a right angle with respect to the cover (13) of the sheet material at a position displaced from said first fold whereby a roof-like lateral projection of the pleated cover (13) extends over said arm (14).

11. The bellows of claim 10 and further including triangular stampings (9) formed in said arm at the intersection of alternate ones of the folds of the pleats of the sheet material of the arm with the span of sheet material in underlying relationship with respect to said cover, with the other alternate folds of the pleats of the sheet material of the arm engaging the underlying span of sheet material.

* * * * *